F. B. NIESZ.

DISK HARROW.

APPLICATION FILED JULY 19, 1910.

Reissued Nov. 1, 1910.

13,163.

2 SHEETS—SHEET 1.

Witnesses

W. A. Williams.

S. L. Burket.

Inventor

F. B. Niesz,

By A. S. Pattison,

Attorney

F. B. NIESZ.

DISK HARROW.

APPLICATION FILED JULY 19, 1910.

Reissued Nov. 1, 1910.

13,163.

2 SHEETS—SHEET 2.

Witnesses

W. A. Williams

L. L. Burket.

Inventor

F. B. Niesz,

By A. S. Pattison,

Attorney

UNITED STATES PATENT OFFICE.

FRANK B. NIESZ, OF CANTON, OHIO, ASSIGNOR TO THE BUCHER & GIBBS PLOW COMPANY, OF CANTON, OHIO, A CORPORATION OF OHIO.

DISK HARROW.

13,163. Specification of Reissued Letters Patent. Reissued Nov. 1, 1910.

Original No. 916,361, dated March 23, 1909, Serial No. 468,399. Application for reissue filed July 19, 1910. Serial No. 572,753.

*To all whom it may concern:*

Be it known that I, FRANK B. NIESZ, a citizen of the United States, residing at Canton, in the county of Stark and State of Ohio, have invented certain new and useful Improvements in Disk Harrows.

The object of the present invention is to provide what might be termed a gang disk harrow, and a further object is to provide a flexible connection between the front and rear sets of disks, so that the ground is not thrown up in ridges when turning corners or when the harrow is moved out of a straight line. Heretofore in disk harrows of this kind the frame carrying the front and rear sets of disks have been formed rigid and difficulty has been experienced in turning corners.

Having set forth the objects of the invention I will now proceed to describe the same in detail, reference being had to the accompanying drawings making a part of this specification and to the numerals of reference marked thereon, in which—

Figure 1:
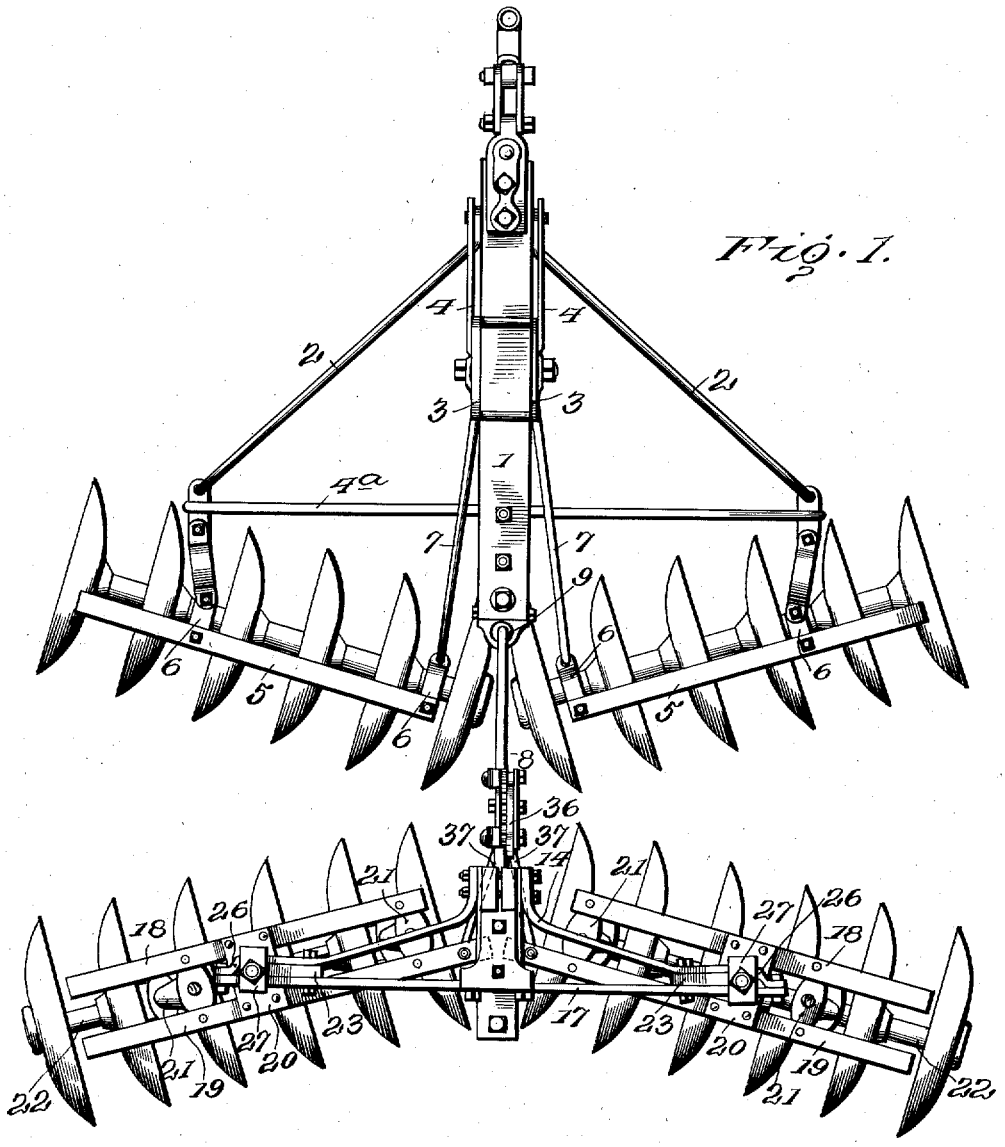
Figure 2:
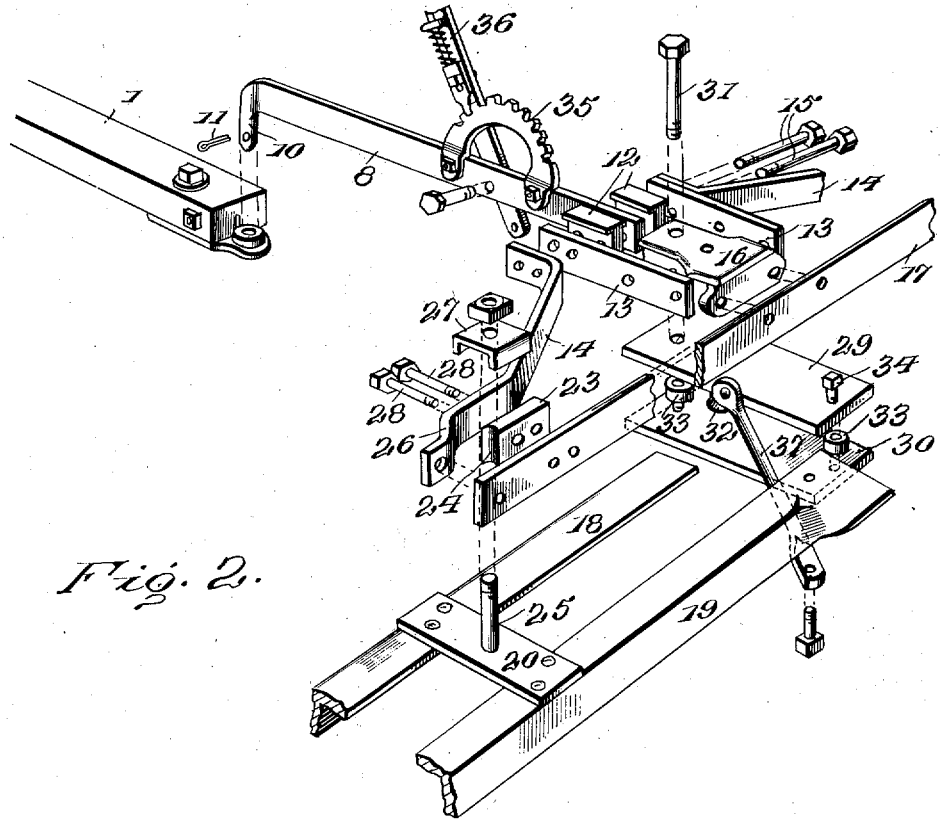

Figure 1 is a plan view. Fig. 2 is a perspective view showing a portion of one of the rear gang frames, the reach and the rear end of the tongue together with the different parts pertaining to the coupling of the two rear gang frames together, showing said parts disconnected and in relative alinement with each other.

Similar numerals of reference indicate corresponding parts in all the figures of the drawings.

In the accompanying drawing, 1 represents the tongue, which is of the usual construction in harrows of this class and to which tongue is connected the usual braces 2 and the notched segments 3 and the levers 4, these parts are of the usual construction and form no specific part of the present invention. The same is true of the bar $4^a$, the bars 5 and their connections including the bearings 6 of the link 7.

To the rear end of the tongue 1 is pivotally attached the reach 8 by means of the apertured plate 9 and the coupling pin 10, which coupling pin is preferably formed integral with the reach 8 and is held against displacement by means of the cotter 11 or its equivalent. To the rear end of the reach 8 are connected the flanged blocks 12 and to the flanged blocks 12 are connected the spaced bars 13, and to the spaced bars 13 are connected the braces 14 all of said parts being securely connected or bolted together and to the reach 8 by means of the clamping bolts 15.

To the rear ends of the bars 13 is connected the head 16 by means of suitable clamping bolts and to the rear end of this head 16 is securely attached the bar 17, which bar is for the purpose of holding in proper spaced relationship with each other the two disk frames, which frames consist of the parallel bars 18 and 19, which bars are held in proper spaced relationship with reference to each other by means of the plates 20 and the various bearing blocks 21 in which bearing blocks are journaled the disk shafts 22. The disk frames are pivotally connected intermediate their ends and are so connected for the purpose of changing the angularity of the disk shafts 22 with reference to each other and to the reach 8 or more particularly with reference to the line of draft.

For the purpose of providing proper pivotal connections for the disk frames proper the blocks 23 are provided, said blocks being provided with the semi-circular grooves 24 which semi-circular grooves are for the purpose of receiving portions of what might be termed the king-bolts 25, said king-bolts being held in proper relationship by means of the braces 14, which braces are provided with the curved flanges 26 said curved flanges so located that they will abut against the king-bolts 25.

For the purpose of assisting in holding the blocks 23 and the braces 14 in proper relationship with reference to the bar 17 the flanged caps 27 are provided, which flanged caps are seated upon the bars 17, the blocks 23 and the braces 14, said cap also serving to provide suitable bearings for the king-bolts 25. In order that a rigid connection may be made as between the bar 17 and the braces 14 clamping bolts 28 are provided, which clamping bolts are located through the bar 17, the blocks 23 and the braces 14.

To the head 16 are connected the spaced plates 29 and 30 by means of the bolt 31 which spaced plates are for the purpose of preventing any tilting of the disk frames together with the different parts carried thereby, said frames consisting of the parallel bars 18 and 19. The spaced plates 29 and 30 are located below the head 16 and are securely clamped by means of the bolt 31. For the purpose of preventing any rocking movement of the plates 29 and 30 the plate 29 is also connected to the head 16 by means of the flat bolt 32. For the purpose of holding the plates 29 and 30 in proper spaced relationship the spacing blocks or thimbles 33 are provided, through which spacing blocks the bolt 31 is passed and also the bolt 34.

To the reach 8 is attached the notched segment 35 and to said reach is pivotally attached the lever 36, which lever is extended downward below the reach and to the lower end of said lever are connected the links 37, said links being pivotally attached to the bars 19 constituting a disk frame proper. It will be understood that as the lever 36 is moved upon its pivotal point the disk frames will be rocked upon their pivotal points intermediate their ends. When the lever 36 is thrown rearward at its upward end its lower end will be carried forward which movement carries the inner ends of the disk frames forward by means of the connecting links 37.

It will be understood that by locating the various frames carrying the disks and their shafts as illustrated in Fig. 1, the rear disk frames and the various disks can be set at different angles with reference to the forward disk frames and the disks by means of which adjustment can be made for different kinds and conditions of soil. It will also be understood that by pivotally attaching the reach at its forward end the rear disk frames will follow with greater ease the forward disk frame. That is to say the hinge connection as between the forward and rear frames permits the turning of sharp corners, which is an important feature both in economy of time and ease in operation.

As shown the pivotal points 9 and 10 of the reach 8 to the front harrow frame is located in a longitudinal line drawn between the inner ends of the disk shafts of the front harrow frame, which insures a straight and even draft of the rear harrow section in respect to the front harrow section, and thus causes the inner harrow disks of the rear frames to at all times travel in such relation to the inner disks of the front section, that the soil turned, and the ditch made by the forward disks, is directly acted upon by the inner rear disks and prevents the leaving of a ditch by the front inner disks, and to easily make short turns in the field, and without burrowing into or scraping the surface.

Having thus described my invention, what I claim and desire to secure by Letters Patent, is:

1. In a disk harrow, the combination with a front draft frame having two separate disk carrying shafts adjustable to assume a rearwardly converging angle, and harrow disks carried by said shafts, of a separate rear disk frame having two separate disk carrying shafts adjustable to assume a rearwardly diverging angle, harrow disks carried by the shafts, a reach bar having its rear end connected to the rear frame and extending forward to the front disk frame, and a horizontally swinging pivotal connection between the reach bar and the front frame and located in a longitudinal line with the apex of the converging angle of the forward disk carrying shafts.

2. In a disk harrow, the combination with a front draft frame having separate disk carrying shafts adjustable to assume a rearwardly converging angle, and harrow disks carried by said shafts, of a rear frame comprising a transversely arranged horizontal member and a reach bar having its rear end rigidly connected to the transverse bar at a point substantially mid-way between its ends, two separate disk shaft carrying frames separately vertically pivotally connected with the transversely arranged member at opposite sides of said reach connection, disk shafts carried by the frames, harrow disks on the shafts, means for adjusting the pivoted frames to assume a rearwardly diverging angle, the front end of the reach having a vertically arranged pivotal connection with the front frame at a point in a longitudinal line drawn between the inner ends of the disk shafts of the front frame.

3. In a disk harrow, the combination with a front draft frame having separate disk carrying shafts separately adjustable to assume rearwardly converging angles, harrow disks carried by said shafts, a forward draft bar connected to the frame and located in a line between the disks at the inner ends of the shafts, of a rear frame comprising a transversely arranged horizontal member and a reach bar having its rear end rigidly connected to the transverse bar at a point substantially mid-way between its ends, two separate disk shaft carrying frames separately intermediately pivotally connected with the outer portions of the transverse member, disk shafts carried by the frames, harrow disks on the shafts, separate means adjustably moving the frames on their vertical pivots to assume rearwardly diverging angles, the front end of the reach bar extending forward and vertically pivotally connected with the rear portion of the said forward draft bar.

4. In a harrow, the combination with a front harrow frame, and adjustable disk shafts carried thereby, of a rear harrow frame flexibly connected at its front end to the front frame at a point between the ends of the front frame, separate disk frames vertically pivotally connected to the rear frame, means adjustably turning the frames on their vertical pivots, and horizontal slidable engaging members between the disk frames and the rear frames to prevent a tilting movement of the disk frames.

5. In a disk harrow, the combination with a front harrow frame carrying harrow disk shafts and harrow disks, of a rear harrow frame having a central draft connection with the front frame, separate disk frames vertically pivotally connected with the rear frame, disk shafts and disks carried by the frames, means for adjusting the disk frames on their vertical pivots, and horizontally slidably engaging members between the disk frames and the rear harrow frame to assist in preventing the tilting tendency of the pivoted disk frames caused by the draft engagement of the disks with the soil.

6. In a disk harrow, the combination with a front harrow frame carrying harrow disk shafts and harrow disks, of a rear harrow frame having a central draft connection with the front frame, separate disk frames intermediately pivotally connected with the rear frame, means for adjusting the disk frames on their vertical pivots, and horizontally projecting engaging members carried respectively by the disk and rear frames, said members located between the vertical pivots of the disk frames and the center of the rear frame.

In testimony whereof I hereunto affix my signature in the presence of two witnesses.

FRANK B. NIESZ.

Witnesses:
H. N. McAbee,
Ray L. Eby.